United States Patent [19]
Hevoyan

[11] Patent Number: 5,344,264
[45] Date of Patent: Sep. 6, 1994

[54] VISE TRANSPORT FOR MILLING MACHINES

[76] Inventor: Varoujan H. Hevoyan, 6318 W. 77th St., Los Angeles, Calif. 90045

[21] Appl. No.: 96,967

[22] Filed: Jul. 27, 1993

[51] Int. Cl.$^5$ ............................................... B23Q 3/00
[52] U.S. Cl. ........................................ 409/235; 248/124; 248/284; 408/103; 409/219
[58] Field of Search ............... 408/103; 409/219, 235; 248/122, 124, 284

[56] References Cited

U.S. PATENT DOCUMENTS

| | | | |
|---|---|---|---|
| 3,038,385 | 6/1962 | Smith | 409/235 |
| 4,185,801 | 1/1980 | Plymoth | 248/122 |
| 4,838,135 | 6/1989 | Hevoyan | 82/124 |
| 5,110,241 | 5/1992 | Shook | 409/235 |

FOREIGN PATENT DOCUMENTS 136704  6/1986  Japan ................................ 408/103

Primary Examiner—Daniel W. Howell
Attorney, Agent, or Firm—William H. Maxwell

[57] ABSTRACT

A vise transport for milling machines and comprised of articulated inner and outer lever arms, the inner lever arm received in an adapter socket secured to the milling machine, and the outer lever arm universally carrying a vise support, the articulating axes of the inner and outer lever arms being vertical and parallel and the axes of the vise support being vertical and horizontal for manipulating positions of the vise and its alignment with the milling machine table to which it is mounted, there being an adapter plate for safe attachment of the vice to the vise support.

11 Claims, 3 Drawing Sheets

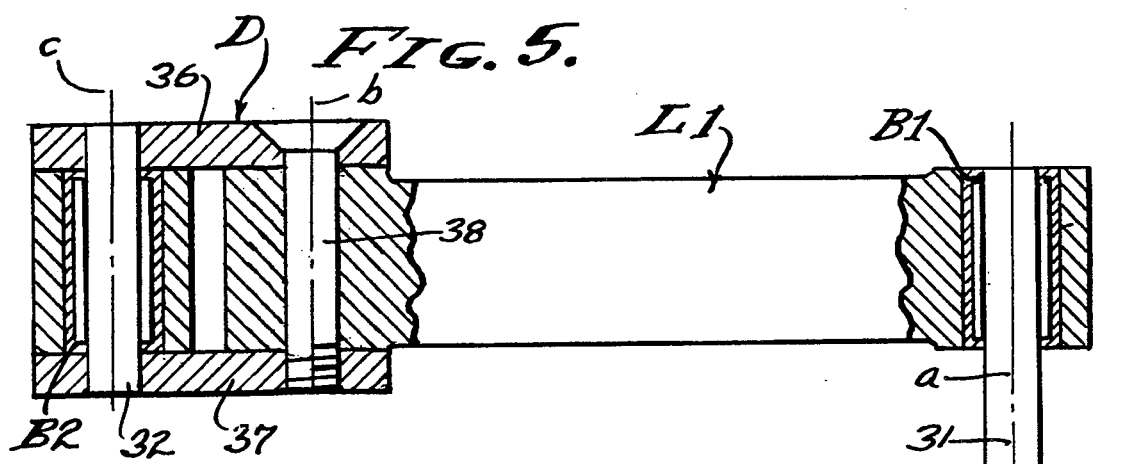
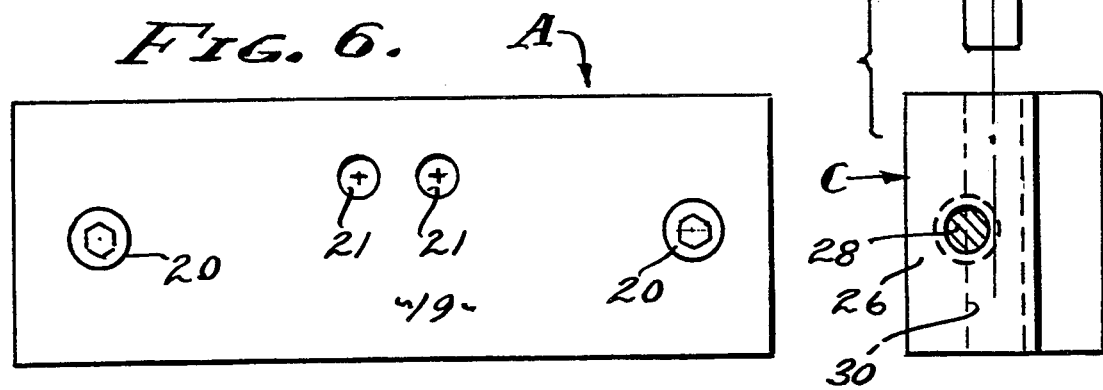
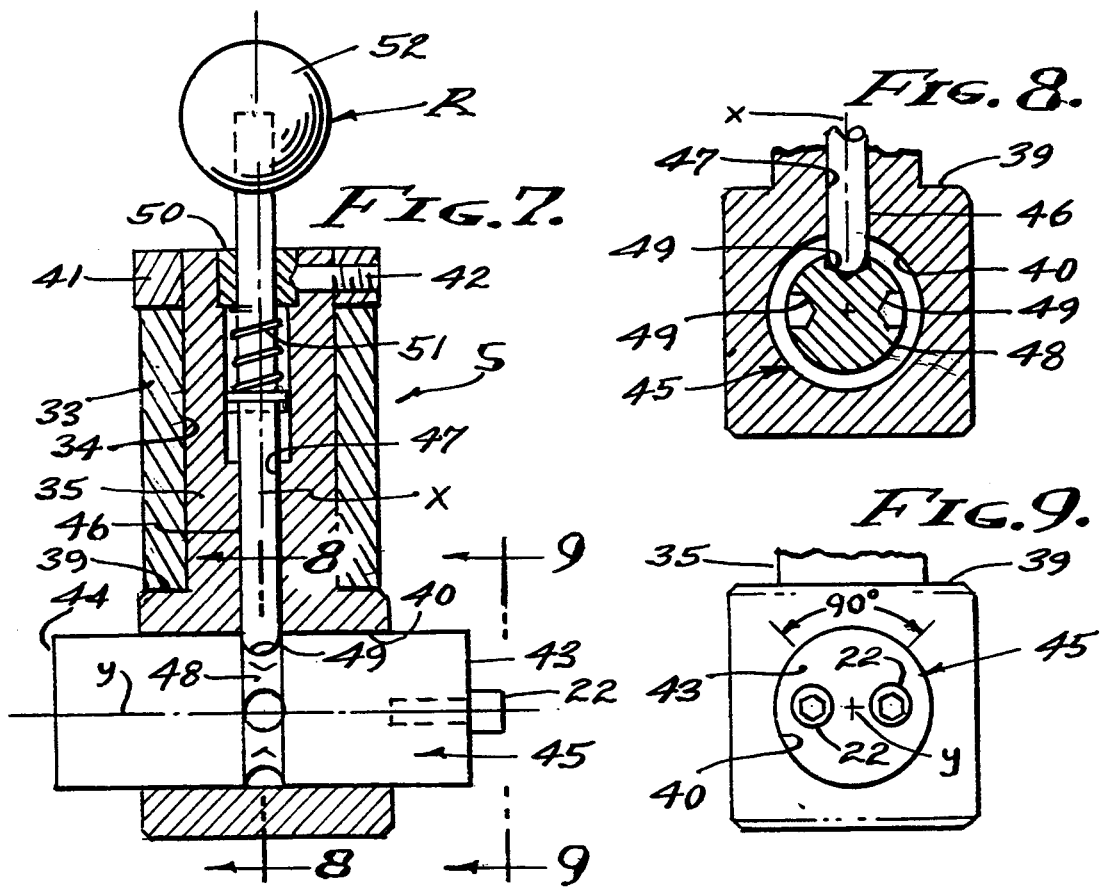

VISE TRANSPORT FOR MILLING MACHINES

BACKGROUND OF THE INVENTION.

This invention relates to machine tools and provides means by which heavy vises are moved into and out of working position secured to a work table of a milling machine or the like. It is very difficult and awkward to move heavy vises (80 lbs. to 140 lbs.) into and out of working position on milling machines, drill presses, and the like. The well equiped machine shop may or may not have an overhead crane, chain-fall or hoist, and these facilities are often ineffectively placed and/or not accessible to the particular machine tool involved. Reference is made to my U.S. Pat. No. 4,838,135 entitled Work Transport For Machine Tools issued Jun. 13, 1989. Apparatus such as cranes, chain-falls and hoists are slow to operate and do not always expedite the handling of heavy vises, and time is of the essence! For the machinist to manually transport heavy vices is often out of the question and not permitted, as injury is most likely. Therefore, it is an object of this invention to provide a vise transport for milling machines that carries heavy vises into and out of working position on the milling machine table where machining processes are to be performed.

Milling machines are characterized by a shiftable work table on which a vise is mounted to carry the work pieces that are to be machined, or a fixture to secure the workpiece for machining. In a milling machine the workpiece is normally secured to the work table by a vise, and with a cutting tool, bit or cutter turned by a spindle on various axes. Drill presses and other similar machine tools have equivalent features, with respect to the workpiece being placed therein as hereinafter described. Therefore, it is an object of this invention to provide a vise support for universal application to machine tools of the type under consideration, a support for moving heavy vises into and out of working position, all as circumstances require.

Difficulty is encountered when a machinist must manually transport a heavy vise over the bed or table of a milling machine and into working position. In a millimg machine it is the spindle axis that must be reached, and the equivalent in other such machine tools. The physical posture of the machinist in cantilevering a heavy vise is unatural, and destructive to his physical well being. Accordingly, it is an object of this invention the provide apparatus that receives or delivers vises alongside the milling machine, and that delivers or receives vises from the work table, as the case may be. With this invention, the physical posture of the machinist is erect and it is no longer necessary for him to cantilever the vise weight from this natural standing posture. That is, the vise is loaded, or removed, by the machinist into the vise transport means, outside of the awkward confines of the machine tool, from which position the vise is transported to and from the work process position.

The removal from and especially the installation of a vise on a milling machine work table requires accurate positioning and thorough cleanliness. That is, it is imperative that all surfaces be clean and previous debris, chips, removed, especially with respect to the bottom of the vise. Accordingly, it is an object of this invention to universally support the vise on this transport apparatus, so that its bottom features are readily accessible for cleaning. This enables flatness and results in precision mill work. In practice, the vise is supported for transport to and from the milling table and is simultaneously supported for rotation on both vertical and horizontal axes. Consequently, the condition of the vice can be determined by direct observation, heretofore practically impossible.

The present invention is to be distinguished from cranes and hoists and the like, which lift from above, and is characterized by an undercarriage type of support that extends into and retracts from the vise position in the machine tool. To these ends it is an object of this invention to provide articulation means for the lateral transport of vices into and out of working position in the milling machine or like machine tools. With the present invention there are inner and outer arms, and the radius of at least one of which involves right-left radius adjustment means. In practice, the right-left radius adjustment means is an adjustable link disposed between the inner and outer arms, so that the work transport can be adapted to either side of the milling machine. The entire apparatus is installed upon a milling machine by means of opposed adapter blocks attached to the vertical ways of the milling machine.

SUMMARY OF THE INVENTION

The vice transport for milling machines as disclosed herein is characterized by articulated inner and outer arms that swing horizontally with a multi-axis support at the distal end of the outer arm to transport and universally position a vise. The inner arm is pivoted on an adapter block attached to the ways of the milling machine. And there is radius adjustment of the arms for horizontal extension and retraction. Positioning of the vise support is adjustable and the apparatus involving the aforesaid features is transferable from one milling machine to another, and it is readily installed and removed and stored in minimal space.

The foregoing and various other objects and features of this invention will be apparent and fully understood from the following detailed description of the typical preferred forms and applications thereof, throughout which description reference is made to the accompanying drawings.

THE DRAWINGS

FIG. 5 is a side view of the inner arm, its socket pin and the adjustable link that joins the two articulated arms.

FIG. 6 is an elevational view of the adapter plate, illustrating the side thereof that interfaces with the fixed jaw of the vise.

FIG. 7 is an enlarged detailed vertical sectional view of the vise support means positioned as shown in FIG. 2.

Figure 1:
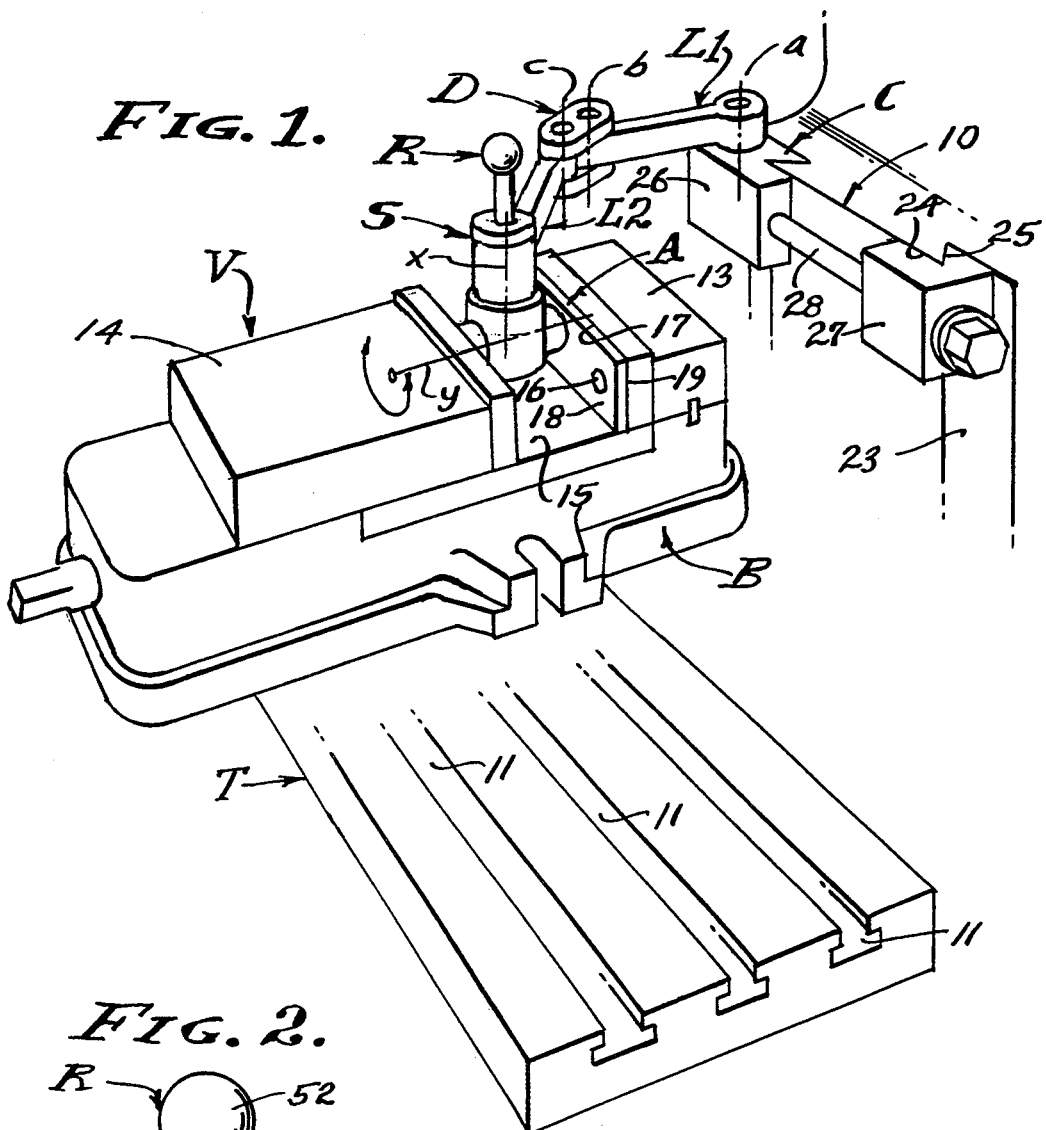
FIG. 1 is a perspective illustration of a typical operation of the vise transport applied to a milling machine to transport a vise to or from said machine.

And FIGS. 8 and 9 are sectional views taken as indicated by lines 8—8 and 9—9 on FIG. 7.

PREFERRED EMBODIMENT

Referring now to the drawings, I have shown this vise transport as it is applied to a milling machine. However, it is to be understood that it is also applicable to any workpiece handling application involving other like machine tools such as drill presses and grinders or any like situation. As shown, the characteristic elements of a milling machine are a work table T carried by a vertical ways 10 to be positioned vertically, there being right angularly related feed means (not shown) to position the table horizontally. T-slots 11 are provided in the top surface of the table to receive bolts 12 for securement of a vise V to the flat planar surface of said table. The usual milling machine vise V has a base B adapted to be secured to the table T by means of two like bolts 12, one at each side (one side is shown), it being imperative that the interface between the bottom of the base and top of the table T be free and clear of debris such as chips or cuttings. As shown, such a vise has a fixed jaw 13 opposing a movable jaw 14 carried upon a flat planar ways 15, the opposing faces of the two vise jaws being parallel and at right angles to the ways 15.

Figure 2:
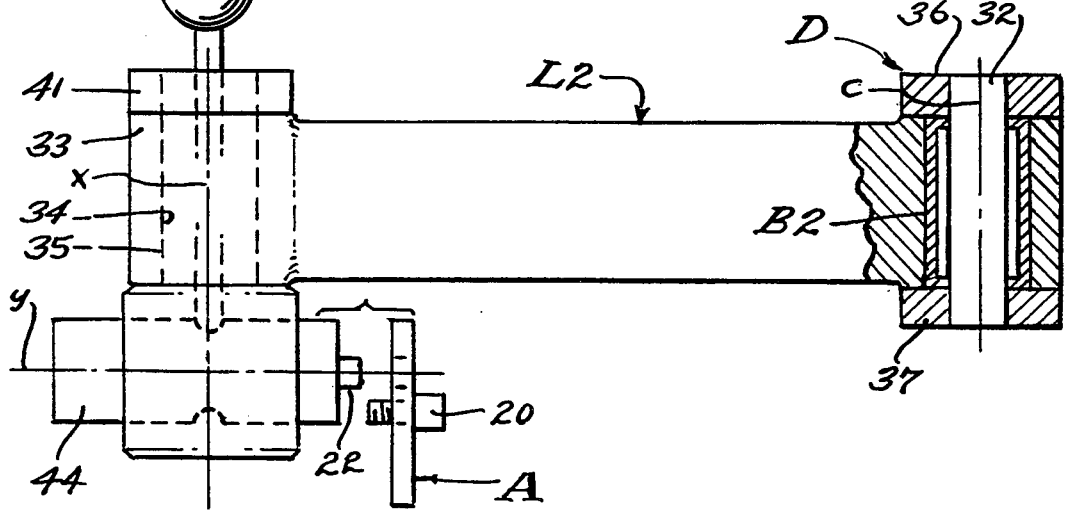
FIG. 2 is side view of the outer arm and the vise support means carried thereby to recieve an adapter plate.

The jaw faces of such vises are replaceable, there being hardened jaws and soft jaws for this purpose. Replaceability is by means of cap screws or the like threaded into spaced openings 16 through the jaw faces, especially the fixed jaw face 17 in this case (see FIG. 2). The position of said openings 16 is standardized and is exactly the same in most vises, ensuring exchangeability, and it is this positioning of said openings to which an adapter plate A is applied (see FIGS. 2 and 6).

The adapter A as shown in FIG. 6 is a flat rectangular plate having parallel front and back faces 18 and 19. The front face 18 is opposed to the movable jaw 14 while the back face 19 interfaces with the face 17 of the fixed jaw 13. The adapter plate is coextensive with the face 17 of the fixed jaw and is provided with spaced projecting pins 20 to register or align with the aforesaid spaced openings 16, for the purpose of locking the adapter plate A to the fixed jaw 13 of the vise V and with its front face 18 opposed to the movable jaw, as shown in FIG. 1. Centered on the adapter plate there is key means shown in the form of spaced openings 21 to register or align with and to receive projecting securement pins 22 of the vise support means S, as will be described. Pins 20 are widely spaced to accomodate the existent openings 16, while the openings 21 are closely spaced to receive the securement pins 22. Alternately, the key means can be a keyway to receive a key projecting from the vise support means (not shown). As shown, the openings 16 and 21 are drilled, and the pins are the cylindrical heads of cap screws threaded into the adapter plate and into the vise support means.

The vise transport involves generally, a socket adapter C for attachment to the milling machine, an inner lever arm L1 for lateral transport, an outer lever arm L2 for longitudinal transport, and a vise support means S for locked engagement with the vise to be transported. The socket adapter C is mounted upon the milling machine, temporarily or permanently, and the vise transport is characterized by an articulated lever arm assembly with the arms L1 and L2 coupled by a right-left radius adjustment means D to reverse and to lengthen or to shorten the reach of these two arms as may be required. A feature is that the lever arm assembly is removable from and replaceable on the socket adapter C, so as to be useable at either side of the milling machine, and the vise support means S is rotatable on vertical and horizontal axes at the distal end of the outer lever arm L2. Adjustment of the vise support means S on the horizontal axis is provided for so as to revolve the vise to expose the planar bottom face of the base B for cleaning.

Figure 3:
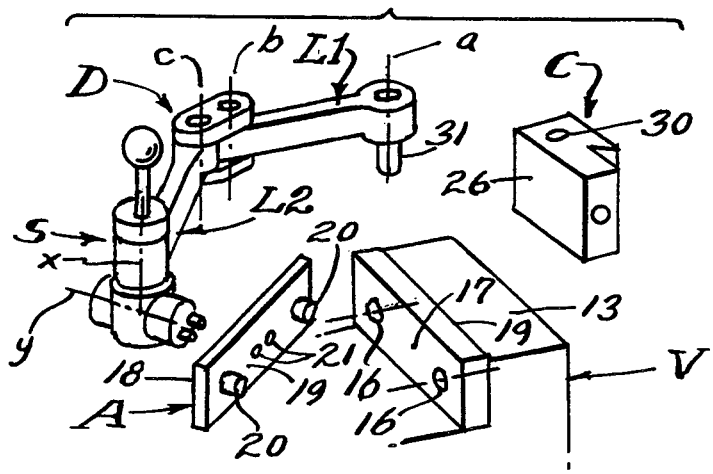
FIG. 3 is an exploded view illustrating the major components as they are associated with the articulated vice transport, including the socket adapter, the adapter plate and the cooperative features on the fixed jaw of the vise.

Referring now to FIGS. 1 and 3 of the drawings and to the socket adapter C, attachment of this vise transport is to the vertical ways 23 of the milling machine. The ways 23 are of dovetail configuration having vertically disposed parallel rails with coplanar front faces 24 and inwardly convergent side faces 25. The carriage (not shown) of the milling machine travels on said rails which extend to and above the normal working height of the work table T, as shown. The socket adapter C is one of two clamp blocks 26 and 27 that are drawn tightly onto the two rails by means of a screw 28. The blocks 26 and 27 have coplanar faces to interface with the front faces 24 of the rails, and they have convergent side faces to interface with the side faces 25 of the rails. This dovetail configuration ensures a tight attachment of the blocks 26 and 27. The socket adapter C, block 26, is provided with a vertical through bore 30 to receive the mounting pin 31 or post of the inner lever arm L1. Accordingly, the block 26 can be interfaced with either rail of the ways 23, for right or left hand installation.

The inner lever arm L1 is a rigid member of moderate length adapted to extend forwardly over the work table T, for example six or six and one half inches between its supported axis a and coupling axis b. The inner end of arm L1 swings horizontally from the axis a where it revolves on a post or pin 31 received in the bore 30 and projecting upward from the adapter block 26. The outer end of arm L1 carries the coupling axis b that is vertically disposed and spaced parallel from the supported axis a. Accordingly, the lever arm L1 transports the coupling axis b over the table T, and in practice through an arc of as much as 180°, a travel of more than twelve inches.

The outer lever arm L2 is also a rigid member of moderate length adapted to extend outwardly as well as inwardly from the coupling axis c, for example seven inches between its coupled axis c and its vertical vise support axis x. The inner end of arm L2 swings horizontally from the axis c where it revolves on a pin 32 carried by the outer end of arm L1. In practice, the pivot 32 is incorporated in the right-left radius adjustment means D later described. The axes b and c are vertically disposed, and the vise support axis x is spaced from and parallel thereto as shown. The distal end of arm L2 carries a boss 33 having a bore 34 adapted to rotatably receive the body 35 of the vise support means S later described. In practice, the height of the work table T is adjusted so that the boss 33 is immediately above the vise V. Accordingly, the lever arm L2 transports the adapter axis x transversely as well as longitudinally through an arc of as much as 180°, a travel of fourteen inches in addition to the aforementioned twelve inch travel of arm L1.

Throughout the drawings I have shown straight arms L1 and L2 revolving and pivoting on anti-friction bearings B1 and B2 at axes a and c. In practice, the pin 31 is press fitted through the anti-friction needle bearing B1 to turn free and to slide into the bore 30. The outer end of inner arm L1 carries links 36 and 37 clamped in position by a screw fastener 38, and the pin 32 is press fitted through the links 36 and 37 on axis c and is free to turn with the anti-friction needle bearing B2. The needle bearings B1 and B2 are lightly press fitted into working position as shown.

The right-left radius adjustment means D is provided to change from a right hand to a left hand installation and to lengthen or shorten the reach of the arms L1 and L2, by adjusting the position of axis c as may be required. Means D is characterized by a toggle that is angularly set on axis b to project from right or left of the distal end of arm L1 that pivotally carries the arm L2. In practice, the toggle is comprised of the pair of upper and lower links 36 and 37 that are clamped to the top and bottom parallel faces of the arm L1 by the screw fastener 38. The outer projecting ends of the toggle links 36 and 37 are aligned by the pivot pin 32 press fitted therethrough and their free inner ends are clamped by the screw fastener 38 on axis c with their parallel inner faces engaged with the top and bottom supporting faces of the arm L1. The toggle is set to project right or left as shown, in which case the radius of arm L1 is reduced. Also, the toggle can be set to project radially from the arm, in which case the radius or arm L1 is increased. The toggle establishes a dogleg coupling between the arms L1 and L2 for adjusting the assembly from right to left and to clear obstacles as may be required.

The vise support means S as it is shown throughout the drawings is carried at the distal end of the lever arm L2 and is adapted to be rigidly clamped in locked engagement with the vise V. A feature of the means S is that it universally mounts the vise on right angularly related x and y axes, so that the vise can be manipulated into rotatably oriented tilted positions for cleaning etc. The aforesaid axis x is vertically disposed through the boss 33 of arm L2 and its bore 34 rotatably carries the body 35 of the means S. The body 35 has an enlarged depending portion defining a shoulder 39 that turns against the bottom of the boss 33 and through which a bore 40 is horizontally disposed on the y axis that intersects the support axis X. A support collar 41 is carried on the body 35 and turns against the top of the boss 33 and is secured there by a set screw 42, so that the body 35 is secured to and free to turn on the vertical axis x. The axis y thereby revolves with the body 35.

Figure 4:
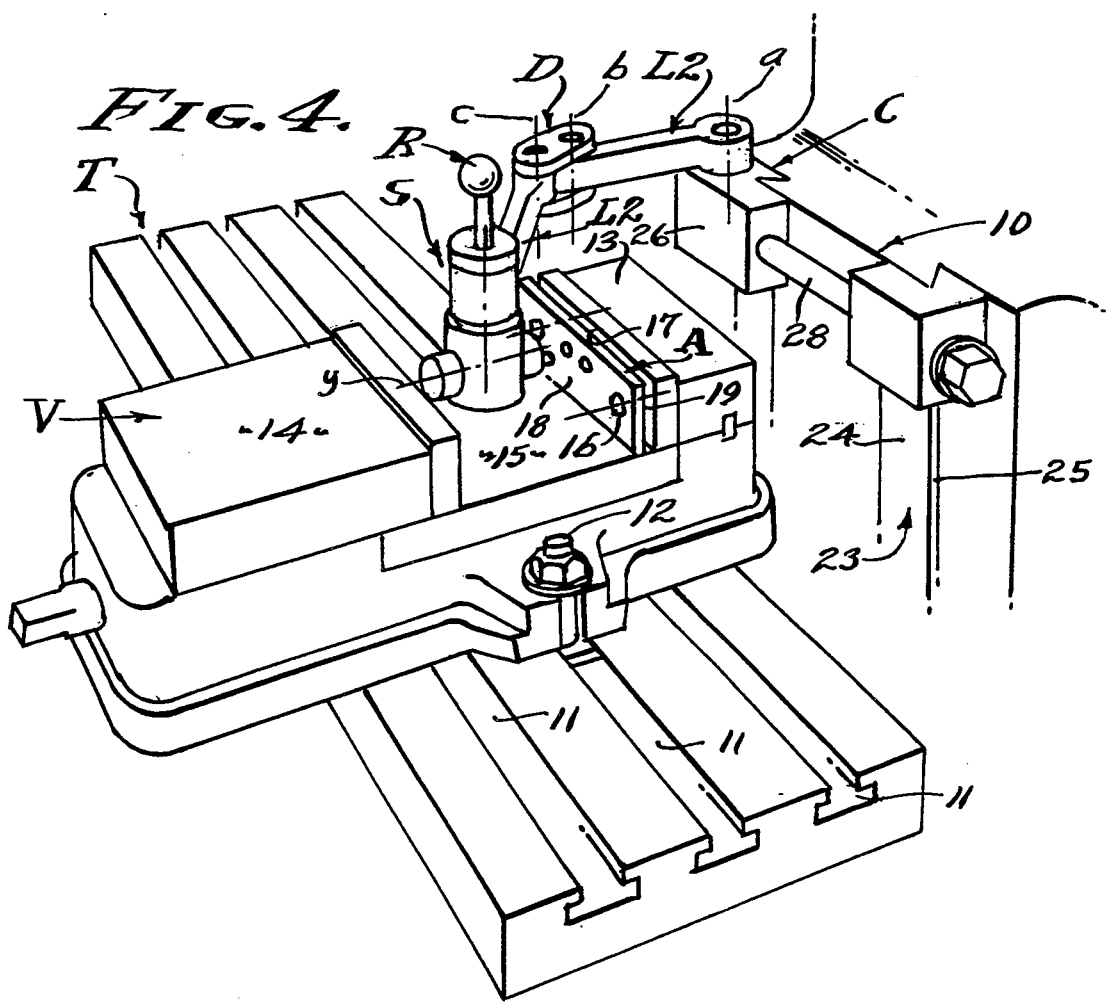
FIG. 4 is a perspective view similar to FIG. 1 and is an illustration of the relationship of parts and elements during the attachment or detachment of the vise to the vise transport means.

In accordance with this invention the vise support means S includes a vise engageable means on the y axis, characterized by oppositely faced jaw engageable faces and its ability to rotate on the axis y while turning on the axis x. As shown and in its preferred form the vise engageable means is a right cylinder 45 rotatable in the bore 40 that opens through the lower portion of body 35, having parallel opposite faces 43 and 44. The face 43 is to oppose face 18 of the adapter plate A, and it carries the two projesting securement pins 22 as illustrated in FIGS. 7 and 9. The face 44 is to oppose the face of the movable jaw 14, being a simple planar face (see FIG. 7). As shown in FIG. 4 the axis y of the vise support means S is positioned so that the securement pins 22 project into openings 16, whereupon the vise is operated to press the right cylinder 45 and force the securement pins into said openings 16 for locked keyed engagement, and the vise tightened for safety (see FIG. 1).

From the foregoing it will be understood how the vise support means S will support the vise V, and that the arms L1 and L2 are free to articulate horizontally on axes a and c. Also, that the body 35 and the vise engageable means are free to turn on the vertical axis x. However, the vise V is most probably imbalanced and will not retain a rotative position on the y axis. Accordingly, I provide roll positoning means R in the form of a releasable bolt 46 that rotatably positions the right cylinder 45. Furthermore, the bolt 46 secures the right cylinder 45 horizontally in the bore 40. In practice, the bolt 46 slides through a bore 47 on axis x in the body 35 and with a nose portion entering an annular groove 48 in the periphery of the right cylinder 45. Spaced detent depressions 49 are provided in said groove, a normal detent engaged as shown in FIG. 8 to position the vise V as shown in FIGS. 1 and 4; and at least one detent at each side to provide right and left turned positions, preferably 90° positions as shown. A spring seat 50 is captured by a set screw with a compression spring 51 depressing the bolt 46. A pull knob 52 is provided to release the bolt nose from the detents. Thus, the vise V is locked in any one of a plurality of rotative positions for cleaning and inspection.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A vise transport for a milling machine and the like having a work table to and from which a vise is to be transported and manipulated, the vise having opposed jaws with means for their clamped engagement with a member therebetween, and including;
   at least one horizontally disposed lever arm with a vertical vise support axis at its outer distal end,
   means for pivotally receiving one inner end of said at least one lever arm on a vertical axis and attached to the milling machine,
   and vise support means comprised of a body rotatably carried by a bearing on the vertical vise supporting axis at the outer distal end of said at least one lever arm and rotatably carrying a member on a horizontal roll axis intersecting the vertical vise support axis and disposed for clamped engagement between the opposed jaws of the vise to support said vise, there being roll positioning means to releasably lock the rotatable roll position of said member on said horizontal axis, thereby rotatably positioning the vise.

2. The vise transport as set forth in claim 1, wherein said roll positioning means is comprised of a bolt operable to engage at least one detent to releasably lock the rotative roll position of said member on said horizontal axis, thereby rotatably positioning the vise.

3. The vise transport as set forth in claim 1, wherein said member carried by the vise support means body is a right cylinder rotatable in a bore through said body there being a member positioning means comprised of a bolt releasably engaged in an annular groove in said right cylinder member to retain said member in said bore through the body.

4. The vise transport as set forth in claim 1, wherein said member carried by the vise support means body is a right cylinder rotatable in a bore through said body, there being a member positioning means comprised of a bolt releasably engaged in an annular groove in said right cylinder member to retain said member in the bore through the body, and there being at least one detent in the annular groove to receive the bolt to rotatably position said member.

5. A vise transport for a milling machine and the like having a work table to and from which a vise is to be transported and manipulated, the vise having opposed jaws and at least one jaw having at least one opening in a face thereof opposing the opposed jaw and with means for their clamped engagement with a member therebetween, and including;

at least one longitudinally disposed lever arm with a vertical vise support axis at its outer distal end, means for pivotally receiving one inner end of said at least one lever arm on a vertical axis and attached to the milling machine, vise support means comprised of a body rotatably carried by a bearing on the vertical vise supporting axis at the outer distal end of said at least one lever arm and carrying a member disposed for clamped engagement between the opposed jaws of the vise and with a key means disposed toward said at least one jaw face having said at least one opening, and an adapter plate disposed between said at least one jaw face having said at least one opening, the adapter plate having at least one pin engageable in the at least one opening in the face of the vise jaw and the adapter plate having key means engageable with said key means on the vise support means member, the vise being locked to the vise support means when clamped thereon.

6. The vise transport as set forth in claim 5, wherein there are spaced openings in the face of the at least one vise jaw, and complementary spaced pins on the adapter plate engageable therewith.

7. The vise transport as set forth in claim 5, wherein the key means on the member of the vise support means is a pair of spaced pins, and wherein the key means on the adapter plate is complementary openings to receive said pair of spaced pins.

8. The vise transport as set forth in claim 5, wherein there are spaced openings in the face of the at least one vise jaw, and complentary spaced pins on the adapter plate engageable therewith, and wherein the key means on the member of the vise support means is a pair of spaced pins and the key means on the adapter plate is complementary openings to receive said pair of spaced pins.

9. A vise transport for a milling machine and the like having a shiftable work table and from which a vise is to be transported and manipulated, the vise having opposed fixed and movable jaws and the fixed jaw having a pair of widely spaced openings in a face thereof opposing the movable jaw and with means for their clamped engagement with a member therebetween, and including;

a horizontally disposed inner lever arm with a vertical coupling axis at its outer distal end, means pivotally securing an inner end of said inner lever arm to a vertical ways of the milling machine and with a vertical support axis to swing horizontally over the work table, a horizontally disposed outer lever arm with a vertical vise supporting axis at its outer distal end, right-left radius means pivoting an inner end of said outer lever arm on the vertical coupling axis at the distal end of the inner lever arm to swing horizontally over the work table, vise support means comprised of a body rotatably carried by a bearing on the vertical vise supporting axis at the outer distal end of said outer lever arm and carrying a member disposed for clamped engagement between the opposed jaws of the vise and with a key means disposed toward said fixed jaw face having said widely spaced openings, and an adapter plate disposed between said fixed jaw face and said member of the vise support means, the adapter plate having a pair or widely spaced pins engageable in the widely spaced openings in the face of the fixed jaw and the adapter plate having key means engageable with said key means on the vise support means member, the vise being locked to the vise support means when clamped thereon.

10. The vise transport as set forth in claim 9, wherein the means pivotally securing said inner lever arm to the vertical ways of the milling machine is a pair of blocks drawn tightly onto parallel rails of the ways by a screw threaded therebetween, there being a bore in one of said blocks and on said vertical support axis to receive a pivot pin depending from the inner end of said inner lever arm.

11. The vise transport as set forth in claim 9, wherein the means pivotally securing said inner lever arm to the vertical ways of the milling machine is a pair of blocks drawn tightlyonto parallel dovetail rails of the ways by a screw threaded therebetween, there being a bore in one of said blocks and on said vertical axis to receive a pivot pin depending from the inner end of said inner lever arm.

* * * * *